United States Patent
Lee et al.

(10) Patent No.: US 11,501,336 B2
(45) Date of Patent: Nov. 15, 2022

(54) METHOD FOR PROVIDING CONTENT USING FIRST SCREEN OF PORTABLE COMMUNICATION TERMINAL

(71) Applicant: FIRSTFACE CO., LTD., Seoul (KR)

(72) Inventors: Jaekyu Lee, Gunpo (KR); Jaelark Jung, Goyang (KR); Jaeyong Jang, Seoul (KR)

(73) Assignee: FIRSTFACE CO., LTD., Seoul (KR)

( * ) Notice: Subject to any disclaimer, the term of this patent is extended or adjusted under 35 U.S.C. 154(b) by 239 days.

(21) Appl. No.: 15/773,509

(22) PCT Filed: Nov. 2, 2016

(86) PCT No.: PCT/KR2016/012548
§ 371 (c)(1),
(2) Date: May 3, 2018

(87) PCT Pub. No.: WO2017/078414
PCT Pub. Date: May 11, 2017

(65) Prior Publication Data
US 2018/0322532 A1 Nov. 8, 2018

(30) Foreign Application Priority Data

Nov. 4, 2015 (KR) .................. 10-2015-0154814

(51) Int. Cl.
*G06Q 30/00* (2012.01)
*G06Q 30/02* (2012.01)
(Continued)

(52) U.S. Cl.
CPC .......... *G06Q 30/0262* (2013.01); *G06F 9/44* (2013.01); *G06F 16/958* (2019.01);
(Continued)

(58) Field of Classification Search
None
See application file for complete search history.

(56) References Cited

U.S. PATENT DOCUMENTS

| | | | | |
|---|---|---|---|---|
| 2001/0051911 | A1* | 12/2001 | Marks | G06Q 30/0275 705/37 |
| 2004/0186778 | A1* | 9/2004 | Margiloff | G06Q 30/0257 705/14.54 |

(Continued)

FOREIGN PATENT DOCUMENTS

| | | |
|---|---|---|
| EP | 2741199 A1 | 6/2014 |
| JP | 2007-280351 A | 10/2007 |

(Continued)

OTHER PUBLICATIONS

International Search Report dated Feb. 10, 2017, issued by the Korean Intellectual Property Office in corresponding application PCT/KR2016/012548.

(Continued)

*Primary Examiner* — Michael Bekerman
(74) *Attorney, Agent, or Firm* — Stein IP, LLC (57) ABSTRACT

A method for providing a content using the first screen of a portable communication terminal is provided. The method comprises the steps of: registering a first content as a content of interest; and providing a second content in the first screen displayed on a display unit when the communication terminal is switched from an inactive state to an active state. Here, the second content, which corresponds to a content related to the first content, is determined on the basis of the first content.

10 Claims, 3 Drawing Sheets

US 11,501,336 B2
Page 2

(51) Int. Cl.
  *G06F 16/958*  (2019.01)
  *G06F 9/44*   (2018.01)
  *G06Q 30/06*  (2012.01)
  *G06Q 20/32*  (2012.01)

(52) U.S. Cl.
  CPC ..... *G06Q 30/0207* (2013.01); *G06Q 30/0251* (2013.01); *G06Q 30/0255* (2013.01); *G06Q 30/0256* (2013.01); *G06Q 30/0258* (2013.01); *G06Q 30/0267* (2013.01); *G06Q 30/0277* (2013.01); *G06Q 30/0641* (2013.01); *G06Q 20/322* (2013.01)

(56) References Cited

U.S. PATENT DOCUMENTS

| | | | | |
|---|---|---|---|---|
| 2006/0282328 | A1* | 12/2006 | Gerace | G06Q 30/0204 705/14.66 |
| 2011/0093320 | A1* | 4/2011 | Blake | G06Q 30/0273 705/14.16 |
| 2012/0179542 | A1* | 7/2012 | Findlan | G06Q 30/0251 705/14.49 |
| 2012/0259707 | A1* | 10/2012 | Thielke | G06Q 30/02 705/14.64 |
| 2012/0284297 | A1* | 11/2012 | Aguera-Arcas | G06F 3/03547 707/769 |
| 2013/0067035 | A1 | 3/2013 | Amanat et al. | 709/219 |
| 2013/0124276 | A1* | 5/2013 | Brown | G06Q 30/0267 705/14.4 |
| 2014/0019253 | A1* | 1/2014 | Ricasata | G06Q 30/0241 705/14.66 |
| 2014/0040035 | A1 | 2/2014 | Cusack | 705/14.61 |
| 2014/0195353 | A1* | 7/2014 | Govan | G06Q 30/0262 705/14.64 |
| 2015/0148005 | A1* | 5/2015 | Chau | G06Q 30/00 455/26.1 |
| 2015/0310493 | A1* | 10/2015 | Chitnis | G06Q 30/0273 705/14.64 |
| 2016/0006678 | A1* | 1/2016 | Jung | G06F 3/04842 726/19 |
| 2016/0044091 | A1* | 2/2016 | Doumet | G06F 3/0482 715/744 |

FOREIGN PATENT DOCUMENTS

| | | | |
|---|---|---|---|
| JP | 2015-22561 A | 2/2015 | |
| JP | 2015-43132 A | 3/2015 | |
| JP | 2015-87938 A | 5/2015 | |
| JP | 2015-520903 A | 7/2015 | |
| KR | 10-2008-0051679 A | 6/2008 | |
| KR | 10-2009-0008777 A | 1/2009 | |
| KR | 10-1154137 B1 | 5/2012 | |
| KR | 10-2013-0079498 A | 7/2013 | |
| KR | 10-2014-0000038 A | 1/2014 | |
| KR | 10-1407032 B1 | 6/2014 | |
| KR | 20140094374 A * | 7/2014 | ......... G06Q 30/0267 |
| KR | 10-2014-0140264 A | 12/2014 | |
| KR | 10-2015-0019178 A | 2/2015 | |
| KR | 10-2015-0045236 A | 4/2015 | |
| KR | 10-2015-0059206 A | 6/2015 | |
| KR | 20150080393 A * | 7/2015 | ............ G06Q 30/06 |
| KR | 10-2015-0121281 A | 10/2015 | |
| WO | WO-2014022347 A1 * | 2/2014 | ............ G06Q 30/02 |
| WO | WO 2014/190297 A1 | 11/2014 | |

OTHER PUBLICATIONS

International Written Opinion dated Feb. 10, 2017, issued by the Korean Intellectual Property Office in corresponding application PCT/KR2016/012548.
Korean Office Action dated Sep. 29, 2017, issued by the Korean Intellectual Property Office in corresponding application KR 10-2015-0154814.
Korean Office Action dated Aug. 11, 2016, issued by the Korean Intellectual Property Office in corresponding application KR 10-2015-0154814.
Korean Office Action dated Feb. 28, 2017, issued by the Korean Intellectual Property Office in corresponding application KR 10-2015-0154814.
Search Report issued by the European Patent Office (EPO) dated May 17, 2019 concerning the corresponding EP patent application 16862430.2.
First Office Action issued by the Japanese Patent Office (JPO) dated May 16, 2019 concerning the corresponding JP patent application 2018-522102.
Second Office Action issued by the Japanese Patent Office (JPO) dated Mar. 25, 2020 concerning the corresponding JP patent application 2018-522102.
Office Action issued by the Korean Intellectual Property Office (KIPO) dated Nov. 27, 2019 concerning the corresponding KR patent application 10-2019-0110181.
Decision to Grant a Patent issued by the Korean Intellectual Property Office (KIPO) dated Jun. 20, 2019 concerning the corresponding KR patent application 10-2018-0135699.
Office Action issued by the Korean Intellectual Property Office (KIPO) dated Nov. 21, 2018 concerning the corresponding KR patent application 10-2018-0135699.
Decision to Grant a Patent issued by the Korean Intellectual Property Office (KIPO) dated Jul. 30, 2018 concerning the corresponding KR patent application 10-2017-0141012.
Office Action issued by the Korean Intellectual Property Office (KIPO) dated Dec. 19, 2017 concerning the corresponding KR patent application 10-2017-0141012.
Office Action issued by the Korean Intellectual Property Office (KIPO) dated Aug. 27, 2020 concerning the corresponding KR patent application 10-2019-0110181.
Decision to Grant a Patent issued by the Korean Intellectual Property Office (KIPO) dated Oct. 20, 2020 concerning the corresponding KR patent application 10-2019-0110181.
Decision to Grant a Patent issued by Japanese Patent Office (JPO) dated Dec. 24, 2020 concerning the corresponding JP patent application 2018-522102.
Office Action issued by the European Patent Office (EPO) dated Feb. 24, 2021 concerning the corresponding EP patent application 16862430.2.
Office Action issued by the Chinese Patent Office dated May 11, 2021 concerning the corresponding No. 201680064760.6.

* cited by examiner

METHOD FOR PROVIDING CONTENT USING FIRST SCREEN OF PORTABLE COMMUNICATION TERMINAL

CROSS-REFERENCE TO RELATED APPLICATIONS

This is a national stage application of International Application No. PCT/KR2016/012548 filed Nov. 2, 2016, which claims the benefit of priority to Korean Application No. 10-2015-0154814, filed Nov. 4, 2015, in the Korean Intellectual Property Office, the disclosure of which are incorporated herein in their entireties by reference.

TECHNICAL FIELD

The present invention relates to a method, a communication terminal, and a computer-readable recording medium for performing a specific operation when a portable communication terminal is activated, and enables a user to easily manage a specific operation at the time of activation.

BACKGROUND ART

Recently, various kinds of terminals, such as a smart phone, a mobile phone, a PDA, a web pad, a notebook computer, a tablet, a phablet, and a wearable device, having various functions in addition to a communication function, have become popularized and widespread. Such a terminal not only enables the same or similar environment as a desktop computer anytime and anywhere but also includes a telephone function and is rapidly becoming generalized. In addition, communication terminals may install an application to be transmitted through an external market as well as an application installed at the time of manufacturing and implement a function of a corresponding application.

Meanwhile, in order to reduce power consumption of the communication terminal, in a case where there is no external input for a predetermined time, a display screen is switched to an off state, and in a case where a user touches on a screen or inputs via a button, a voice instruction is received from the user, or a display cover portion is opened, the display screen is switched to an on state again. At this time, the display screen may provide a standby screen that is a use standby screen of the communication terminal, or a lock screen for preventing an unintended standby screen switching prior to the standby screen may be provided. At this time, the lock screen may be switched to the standby screen according to an additional input of the user. Furthermore, the lock screen may be switched to the standby screen only in a case where a user authentication such as a lock code, a lock pattern, and user biometric information is completed. The lock screen may include basic information such as time and remaining battery power, and may include a user interface for unlocking.

DISCLOSURE

Technical Problem

In a case where content such as an advertisement is provided through a lock screen, since contents unintended by a user are randomly exposed, a communication terminal user does not utilize the contents. Therefore, an effect of content transfer may not be performed.

Technical Solution

An embodiment of the present invention provides a method of providing a content using a first screen of a portable communication terminal. The method includes: registering a content of interest including outputting a first screen including a first content and a user input interface to a display, receiving a user input for the first content through the user input interface, and registering the first content of which the user input is received as the interest content; receiving an activation request signal from a user in a state in which the display of the portable communication terminal is turned off; and displaying a second screen that provides a second content related to the first content registered as the interest content on the display that is turned on according to the activation request signal. The second screen further includes a first input interface for accessing a third content related to the second content, and a second input interface for entering to a standby screen of the portable communication terminal.

Another embodiment of the present invention includes determining the second content. The determining the second content includes: checking the first content registered as the interest content; comparing the first content with a plurality of contents that are able to be provided; setting a priority according to a similarity between the first content and the plurality of contents that are able to be provided through the comparing; and determining the second content among the plurality of contents that are able to be provided according to the set priority.

In addition, in another embodiment of the present invention, the second content includes an update content of the first content. In addition, the second content has the same category as the first content.

In another embodiment of the present invention, the second content may include a plurality of contents, each of the plurality of contents may be divided and displayed on the second screen, and positions or sizes of the plurality of contents disposed on the second screen may be different according to the priority. In addition, the second content may include a plurality of contents, the second screen includes a main screen that is turned on when receiving the activation request signal and a sub screen that is displayed according to an up-down or left-right scroll, and each of the plurality of contents may be individually displayed on the second screen, and a content displayed on the main screen of the second screen may be determined according to the priority.

In another embodiment of the present invention, the first content may include product information, the second content may include content for a product included in the first content or a product of the same category, and third content may provide a third input interface capable of purchasing a product displayed by the second content. In a case where an input is received from the first input interface, a first reward may be provided to the user, in a case where the input is received from the second input interface, a second reward may be provided to the user, and the first reward may be greater than the second reward. The first input interface may include a first point that is a start point of the input and a second point that is an end point of the input, when the input of the user moves from the first point to the second point, the input of the user may be recognized as the input for the first input interface, and when the input of the user moves from the first point to a third point different from the second point, the second input interface may recognize the input of the user as the input for the second input interface.

Another embodiment of the present invention provides a method of providing an advertisement using a lock screen of a portable communication terminal. The method includes: providing product information through a display of the portable communication terminal; receiving an interest product registration request from a user with respect to the product; registering the product as an interest product of the user; determining an adjacent product on the basis of a similarity with the interest product; and providing an advertisement for the adjacent product to the lock screen of the portable communication terminal. The lock screen is a screen displayed when the display of the portable communication terminal is switched from an off state to an on state according to a user input. The lock screen includes an advertisement area for the adjacent product, an unlock interface, and a link interface to the adjacent product.

In further another embodiment of the present invention, the determining the adjacent product may include: checking the registered interest product; comparing the interest product with a plurality of pieces of product information that are able to be provided; setting a priority of the plurality of products that are able to be provided according to a similarity degree between the interest product and the plurality of products that are able to be provided through the comparing; and determining the adjacent product according to the priority.

In addition, the adjacent product may be the same goods as the interest product and is a product provided at a price different from that of the interest product. In addition, the adjacent product may include a plurality of products, advertisements for the plurality of adjacent products may be divided and displayed on the lock screen, and positions or sizes of the plurality of adjacent products disposed on the lock screen may be different according to the priority.

In further another embodiment of the present invention, the adjacent product may include a plurality of products, the lock screen may include a main screen that is turned on when the display is turned on and a sub screen that is displayed according to an up-down or left-right scroll, each of the plurality of adjacent products may be individually displayed on the lock screen, and an adjacent product advertised on the main screen of the lock screen may be determined according to the priority.

In addition, a first reward may be provided to the user with respect to the link interface input, a second reward may be provided to the user with respect to the unlock interface input, and the first reward may be greater than the second reward.

Advantageous Effects

According to an embodiment of the present invention, when a user activates a communication terminal, a content in which the user is interested can be provided. Therefore, provision of a content through a lock screen of a communication terminal can be performed thereby maximizing a content exposure effect. In addition, the user can receive only content in which the user is interested, thereby preventing exposure to indiscriminate content.

According to an embodiment, a content provider can provide only content in which a user is interested to the user by selecting the content in which the user is interested, thereby providing a content to an accurately targeted user.

MODE FOR INVENTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the present invention, although different from each other, are not necessarily mutually exclusive. For example, specific shapes, structures and characteristics described herein may be implemented as modified from one embodiment to another without departing from the spirit and scope of the present invention. Furthermore, it shall be understood that the locations or arrangements of individual components within each embodiment may also be modified without departing from the spirit and scope of the present invention. Therefore, the following detailed description is not to be taken in a limiting sense, and the scope of the invention is to be taken as encompassing the scope of the appended claims and all equivalents thereof.

In the present specification, a term 'communication terminal' is a digital device including a wired/wireless communication function or other functions and refers to a digital device having an arithmetic operation capability by including memory means and loading a microprocessor, such as a mobile phone, a navigation device, a web pad, a PDS, a workstation, a personal computer (for example, a notebook computer or the like), a mobile phone, a smart phone, a tablet, a phablet, a wearable device. In the present specification, a mobile phone is described as an example of the communication terminal, but the present invention is not limited thereto.

In the present specification, a term 'inactive state' means that the communication terminal is in a state in which communication is possible but a display screen is off. Although the display screen is in the off state, a predetermined function (for example, a music playback function or the like) may be operated. As described above, the term 'inactive state' is a concept that includes a state in which the display screen is in the off state regardless the communication terminal is performing a predetermined operation or not. However, a state in which power of the communication terminal is completely turned off is excluded.

In the present specification, a term 'active state' means a state in which the display screen of the communication terminal is in an on state. The switch from the 'inactive state' to the 'active state' means switching from a state in which the display screen is in the off state to a state in which the display screen is in the on state, and is not limited to information displayed on the display screen in the on state. For example, although only a lock screen is displayed, this may be referred to as the 'active state' of the communication terminal. In addition, the switch from the inactive state to the active state may be implemented through various methods such as an input of a button, a touch of a screen, an instruction through a voice, or an operation of opening a cover that covers a display.

In the present specification, a term 'standby screen' is a basic screen that provides a user interface so that the user may use the communication terminal, and generally is a screen that displays an icon, a background image, time, remaining battery power, a communication connection state, and the like of various kinds of applications. The user may input to an application through the user interface such as an icon in the standby screen to drive the application. The standby screen may include a plurality of screens, and the user may slide a screen left and right or up and down to switch the standby screen to another standby screen. A background image, an icon arrangement, and the like of the standby screen may be set by the user. In general, the standby screen is a menu screen provided to the user in order to control the entire communication device when a display of the communication device is turned on. The standby screen is distinguished from a screen in which a specific application is driven and a user interface for driving an application is provided.

In the present specification, a term 'first screen' refers to a specific screen displayed on the display when the communication terminal is switched from the inactive state to the active state, and is a screen distinguished from the standby screen that is the use standby state of the communication terminal. For example, the first screen may be the lock screen. The lock screen is a screen for preventing an immediate entry to the standby screen when the user unintentionally turns on the display. The entry to the standby screen may be performed when an additional user input is additionally input in the lock screen. For example, in a case where the user touches or slides a specific image of the lock screen, the entry to the standby screen may be performed. In addition, the lock screen may include a user authentication step. For example, the lock screen may include the user authentication step such as biometric information such as a passcode, a lock pattern, a fingerprint, an iris, and a voice input by the user in advance. Therefore, the lock screen may enable the user to enter the standby screen only in a case when the user is identified as an authorized user.

In the present specification, the 'first screen' may include the lock screen as described above. For example, the first screen may be displayed prior to the standby screen equally to the lock screen and may enter to the standby screen in a case where there is an additional input of the user. Furthermore, the first screen may not only provide a function of the conventional lock screen but also provide content to the user using the background of the lock screen. At this time, the content may include an advertisement such as product information and event information, and may include information such as news, weather, notification, a memo, and, social network service. As described above, the first screen is not limited to displayed content and is a screen displayed when the display is switched from the off state to the on state. As long as a screen is displayed before entering to the standby screen and includes a user interface for entering to the standby screen, any screen may be included in the first screen.

Hereinafter, an embodiment of the present invention will be described with reference to the drawings.

The embodiment is merely an example for understanding the invention, and configurations of each embodiment may be combined to configure a new embodiment.

First Embodiment

The first embodiment describes a method of providing a first screen through one application.

Basically, the application may be an application that provides a first content. At this time, for example, the first content may be an advertisement such as product information, service information, shop information, and event information, information content such as news, weather, and webtoon, a messenger, social network service, and the like. Hereinafter, the product information among various contents is described as an example.

The application may be an application that performs a provision of the product information and a sale. For example, the application may be an online shopping mall application and a social commerce application. In addition, the application may be a search portal that provides the product information according to a user search, mediates a sale, or performs a directly sale. In addition, the present embodiment describes a case where the first content is provided in a mobile environment, for example, a smart phone, a tablet PC, or the like as an example. However, the first content may be content provided in a PC environment. In this case, a web page of the PC environment and a mobile application corresponding to the web page may be linked with each other, and thus a process of the PC environment may be reflected to a mobile application.

Figure 1:
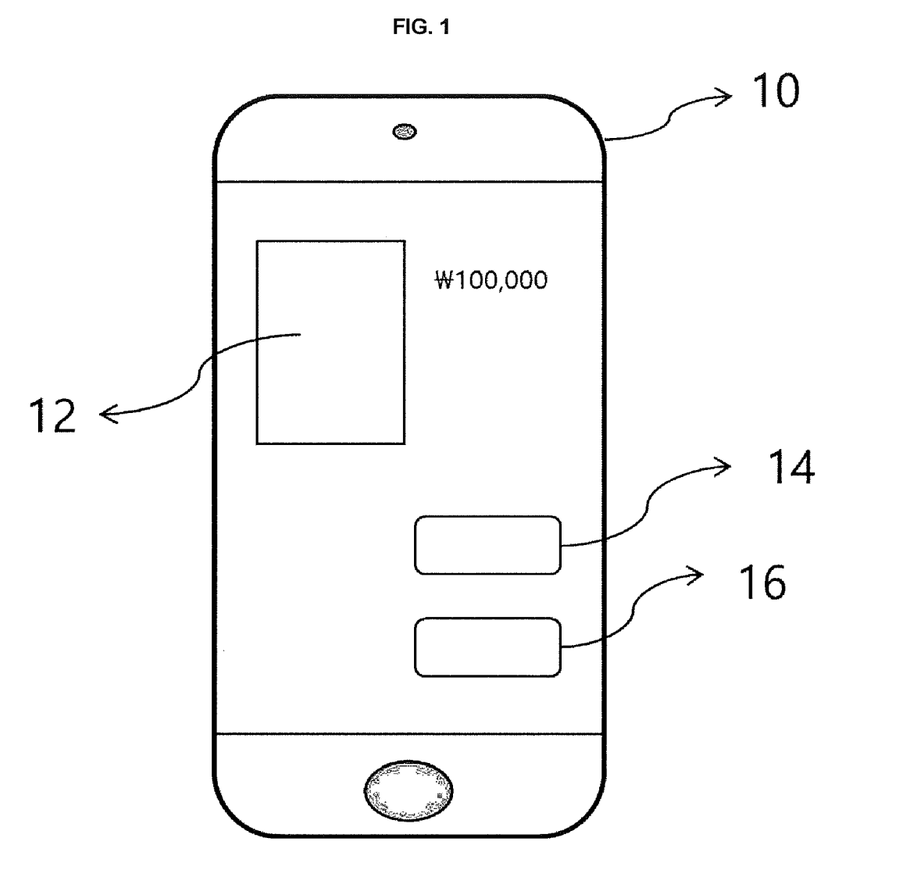
FIG. 1 is a diagram schematically illustrating a screen that provides a first content.

FIG. 1 is one example of a first content information provision page that is provided from the application, and shows a product information provision page. The product information provision page may be provided through a display of a communication terminal 10. Information on a product may be provided to a product information display area 12. A product information page provided to the user may be accessed by the user through a search or may be provided first to the user by the application. The product information page may include information on the product itself, seller information, store information, price information, additional information, and the like. In addition, the product information page may include an interface for payment of a corresponding product.

In addition, the product information page may also include an interest product registration interface 14. Generally, in a case where the user purchases online, the user searches for various same or similar goods, compares the goods, and purchases the goods rather than directly purchasing the goods in a first search, in many cases. In addition, although the user does not intend to purchase the goods at the moment, the user registers the goods as an interest product in order to purchase the goods later in many cases. In a case where the goods are registered as the interest product, a corresponding product information provision page is recorded in a separate category, and thus the user may check the goods through an interest product list later. The interest product registration interface may be provided by various names such as 'shopping basket', 'bookmark', 'good', and 'selection'. In addition, an interface is an interface to which various interfaces such as a touch of a touch screen, a click of a button, a slide of a touch screen, and a voice instruction may be applied, and the interface is not limited to the shape thereof. In addition, a payment interface 16 may be provided for a case where the product is directly purchased.

In a case where the user registers specific product information as the interest product, the first embodiment stores the interest product, and determines a second content to be provided to the first screen which will be described later according to the stored interest product information. Details of the second content provision will be described later.

Figure 2:
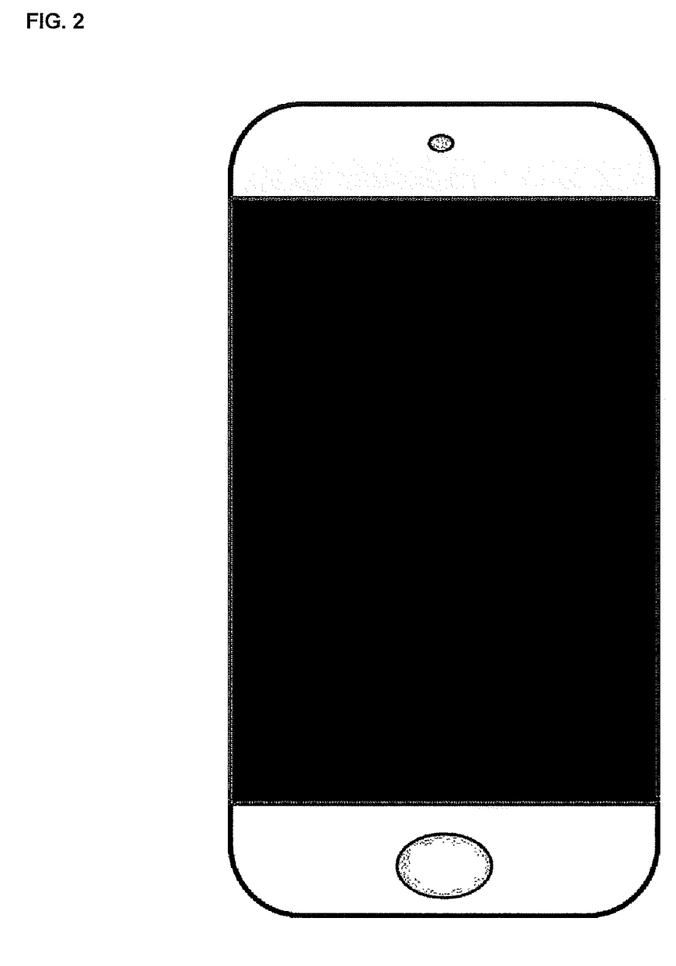
FIG. 2 is a diagram illustrating an inactive state of a communication terminal.

FIG. 2 illustrates a state in which the communication terminal is inactive. In a case where the user does not perform an input to the terminal for a predetermined time, the communication terminal turns off the display. For example, a case where there is no input for a predetermined time in a state in which the application is driven, a case where there is no input for a predetermined time in the standby screen after exiting the application, or a case where there is no input for a predetermined time while the application is driven, the switch to the inactive state is performed as shown in FIG. 2.

Figure 3:
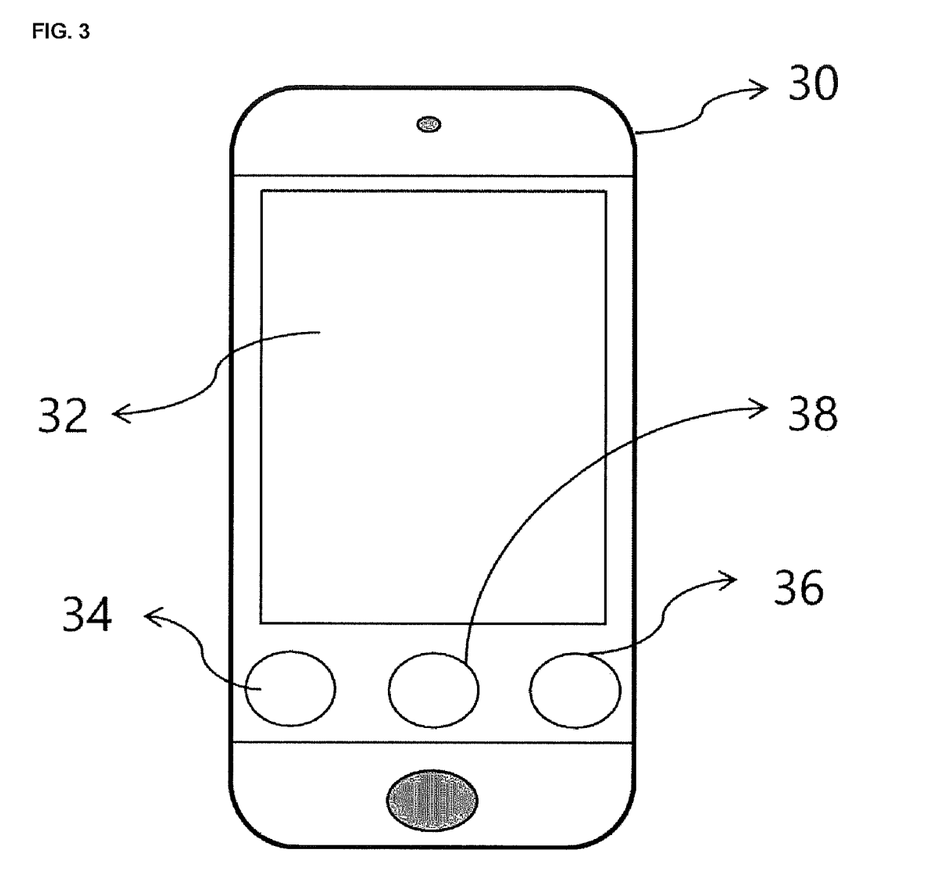
FIG. 3 is a diagram illustrating a first screen of the communication terminal.

FIG. 3 illustrates the first screen according to the first embodiment. In a case where the user performs an input in the inactive state as shown in FIG. 2, for example, in a case where the user pushes down a physical button such as a home button, a power button, and a volume button, in a case where the user touches a touch screen, or in a case where the user performs a voice instruction, the communication terminal 30 turns on the display. In this case, the first embodiment provides the first screen as shown in FIG. 3.

The first screen includes the second content 32. The second content is a content related with the first content. The second content is a content determined on the basis of the first content that is registered as the interest product by the user having a purchase intention or interest. Therefore, content desired by the user can be provided, and thus an accurately targeted information provision is possible.

For example, in a case where the first content is specific product information, the second content 32 may be information on the same product such as the same product information, the same product information provided from a different seller, and the same product information having different prices, and may be product information similar to a corresponding product. In addition, the second content 32 may be information of a category different from that of the first content. For example, in a case where the first content is event information such as a performance, the second content 32 may be product information related to a corresponding event, movie information related to the corresponding event, shop information, and the like. That is, the second content is information targeted the user interest in the first content. The second content may accurately provide pieces of information that the user is actually interested in differently from the existing targeting information merely based on age, sex, region, and the like. Meanwhile, in a case where the advertisement is provided through the first screen, there is an advantage that an advertisement provider may often expose the advertisement to the user. However, whenever the user turns on the display, the user is exposed to an unwanted advertisement. Therefore, fatigue and refusal feeling for the exposure to the advertisement may occur, and thus the user may not drive the application. On the other hand, in a case of the first embodiment, since the information related to the product registered as the interest product by the user actually having a purchase intention is provided, the user may more interested in the information. Therefore, although the information is provided to the first screen, the refusal feeling of the user may be reduced.

An example of a process of determining the second content will be described. The application has a plurality of second contents to be provided to the first screen. The second content may always be provided to the communication terminal from an external server. For example, the second content may be provided when the communication terminal is in the inactive state, and the second content may be provided at the moment of turning on the display. A step of determining the second content among a plurality of contents may be executed in the application of the communication terminal, or the second content determined by executing the step of determining the second content may be provided to the communication terminal. For example, in a case where the step of determining the second content is executed in the communication terminal, the application receives the plurality of contents from the external server, compares the first content stored as the interest product by the user in advance with the plurality of contents, and determines the second content. Alternatively, the application may transmit the first content to the external server, and the external server may transmit the second content determined by comparing the received first content with the plurality of contents. That is, the determination of the second content may be executed in the application or the external server, and the second content determined according to the execution is output to the first screen of the communication terminal.

Various comparison analysis algorithms may be applied to a method of determining the second content. For example, a category of the first content may be classified from a large category to a small category step by step and a similarity degree may be measured according to a matching step. Various methods may be applied to an algorithm for a similarity analysis, and the algorithm for the similarity analysis is not limited to a specific algorithm.

The second content may be provided as a plurality of contents. For example, in a case where a priority is measured according to the similarity analysis, a content having the highest similarity may be provided as a first priority and a content having the next similarity may be provided as a second priority.

A method of providing the plurality of second contents to one first screen will be described. The plurality of second contents may be provided to one screen. For example, an area where the second content is provided may be divided and thus the plurality of second contents may be output at the same time. In addition, the higher priority content may be output in a larger size or may be positioned at a more central position according to the priority of the plurality of second contents. In addition, the first screen may be configured of a plurality of screens. For example, a screen that is basically displayed when the display is turned on may be set as a main screen, and the screen may be moved from the main screen to a sub screen through an input interface such as an up and down or left and right slide. In this case, the second content having the highest priority may be displayed on the main screen according to the priority, and the second content may be displayed on the sub screen according to the next priority. The user may check the second content having the highest priority by the main screen of the first screen. In addition, the user may check the second content having the next priority by sliding the screen up and down or left and right, as occasion demands. In addition, the up and down slide interface and the left and right slide interface may be distinguished from each other. For example, when the user slides left and right, the same category, for example, in a case where the first content is the product, the second content for the product information is displayed, and in a case of the up and down slide, a different category, for example, shop information, performance information, event information, and the like related to a corresponding product may be displayed.

The first screen may also include a user input interface. For example, the first screen may also include a link interface 34 for moving to a third content that provides specific information of the second content. For example, in a case where the second content is an advertisement for the product, the third content may be a purchase site of the product. For example, the third content may also provide an interface capable of purchasing the product provided from the second content. The link interface may be a movement to the third content, but is not limited thereto. For example, in a case where the second content is an advertisement for an application, the link interface may be an interface allowing a download of the application or a link to a page capable of downloading the application. The link interface may be overlapped on the second content and may be provided as an input for touching or clicking the second content, or the link interface may be provided separated from the second content. For example, as shown in FIG. 3, the link interface may be provided as a separate image in a lower end portion of a second content image 32, but is not limited thereto. The link interface may be provided on a side surface or on an upper surface of the second content image. The user may directly touch or click the link interface 34, or may input the link interface by sliding from a specific position 38 to the link interface. For example, in a case of FIG. 3, the link interface may be input in a case of a slide from a central image 38 to the left side.

In addition, the first screen may further include an unlock interface 36 for entering the standby screen. Similarly to the link interface, the unlock interface may be displayed as an image, and the position thereof is not specifically limited. In also a case of the unlock interface, an image may directly be touched or clicked. In addition, as shown in FIG. 3, the unlock interface may be input by a slide from the central image 38 to the right side.

The application may provide a reward to the user when the unlock interface is input and/or the link interface is input. The reward may be a point usable like cash in a corresponding application, may be a card point, a game point, or cash, and the kind thereof is not limited. Through the reward, the user may more actively accept the content provision through the first screen. A sum of money of the reward through the link interface and the lock interface may be different. For example, the reward for a link interface input may be greater. In addition, for user convenience, a reward point to be provided to images of the link interface and the unlock interface may be expressed as a number. Therefore, the user may visually check a reward point that may be saved, and thus the user may also select the link interface or the unlock interface. The unlock interface is not limited to an input through a touch screen, and may be implemented through a biometric information recognition such as a fingerprint recognition, a voice recognition, and an iris recognition. For example, in a case where the lock screen is set by the fingerprint, the user may perform unlocking by touching a fingerprint recognition sensor on the first screen, and may enter to the standby screen.

According to the first embodiment, the user can be provided with information on a product same as or similar to the product designated as the interest product in the application, an event, a shop, and the like through the first screen. In addition, through the reward for the information, a refusal feeling for the first screen content can be minimized. In addition, an application provider provides information on the product in which the user interested on the first screen, and thus the user may be connected to a link page with a higher probability.

Second Embodiment

The second embodiment is an embodiment in which the provision of the first content and the provision of the second content are implemented in different applications, and a part different from the first embodiment will be mainly described. That is, a part common to the first embodiment will be omitted.

In the second embodiment, a first application that provides the first content may be different from a second application that provides the second content and the third content. For example, the first application may be a shopping application that provides the product information and sells the product online, and the second application may be a lock screen application that provides content such as an advertisement and news using the lock screen. In a case where the user registers the first content as the interest product, the first application transmits information on the first content to a server of the second application. For example, the first application transmits identification information of the user and the product information registered as the interest product by a corresponding user to the server of the second application. Alternatively, after the first application transmits the identification information of the user and the product information to a server of the first application, the server of the first application may transmit the identification information of the user and the product information to the server of the second application. The server of the second application receives the identification information of the user and the product information and determines the second content the same as or similar to the first content registered as the interest product. The server of the second application transmits the determined second content to a communication terminal of the user having the corresponding identification information to enable the determined second content to be output when the user turns on the display of the communication terminal. The description of the first screen output afterward is the same as the first embodiment.

Third Embodiment

In the third embodiment, different applications may be provided equally to the second embodiment. However, in the third embodiment, the first application does not transmit information to the server of the second application, and the communication terminal of the user may transfer the information to the second application. For example, the interest product information may be stored in the communication terminal of the user and the second application may access the communication terminal of the user. Alternatively, the interest product information may be directly transmitted to the second application. Therefore, the second application may receive the information on the interest product from the first application and may determine the second content according to the information. For example, the second application may receive the information on the interest product from the first application and may determine the second content on the basis of the information on the interest product. That is, the second application may compare and analyze a plurality of contents received from the server of the second application and the interest product, and may determine a priority of the plurality of contents according to a similarity. The description of the first screen output afterward is the same as the first embodiment.

Fourth Embodiment

The fourth embodiment described a specific embodiment that provides an advertisement through the lock screen using a shopping application.

The shopping application is an application that is installed in a portable terminal and supports a user to search for and purchase a product, and is not limited to a name thereof. Typically, the user drives the shopping application and searches for a desired product through a search. In a case where the user selects specific product information in a provided list, a screen that provides information on the corresponding product is displayed. A product information provision screen may display information such as a description for the product, seller information, an area of production, and a price, and may also include a payment interface for connecting the user to a payment process so that the user is able to purchase the corresponding product. In addition, the product information provision screen may also include a registration product registration interface that enables the user to register the corresponding product as the interest product. In a case where the user registers the corresponding product as the interest product, the corresponding product may be stored in a separate interest product list, a shopping basket, a bookmark, and the like so as to enable the user to easily find the interest product by driving the shopping application later.

According to the present embodiment, in a case where the user registers the corresponding product as the interest product, the shopping application determines an adjacent product that is similar to the interest product. The determination of the adjacent product may be progressed by the shopping application itself. Alternatively, the interest product information may be transmitted to a shopping application server and the shopping application server may determine the adjacent product. The adjacent product may be determined according to a similarity between the adjacent product and the interest product. The higher the similarity is, the higher priority is set and thus may be exposed to the user preferentially. A method for the similarity determination that determines the adjacent product may refer to the description of the first embodiment.

An advertisement for the adjacent product may be displayed on the lock screen of the portable terminal. For example, in a case where the user turns on the display of the portable terminal, the lock screen may be displayed, and at this time, the advertisement for the adjacent product may be displayed on the lock screen. In addition, the lock screen may also include an interface for unlocking and a link interface for additional information for the corresponding adjacent product in addition to an area where the advertisement for the adjacent product is provided. More detailed description for the lock screen of the fourth embodiment may refer to the description for the first screen of the first embodiment.

The advertisement provision method according to the fourth embodiment may provide the reward to the user. For example, when proceeding from the lock screen to the unlocking, and when linked to an additional information page for the adjacent product, the rewards may be provided, respectively. At this time, the reward of the linked case may be set to be larger, thereby inducing the user to approach the adjacent product. In addition, the reward may be a usable point in the shopping application according to the fourth embodiment. Therefore, in a case where the user uses a corresponding shopping application, the user can obtain information on the product similar to the interest product through the lock screen. Furthermore, the user can save a point through an action of simply viewing the advertisement on the lock screen or an action of connecting to the link page, and thus the user can utilize the point as payment means in the corresponding shopping application.

In addition, a company providing the shopping application can provide an advertisement by accurately targeting the advertisement for a product desired by the user, and thus it is very efficient in selling the product.

The embodiments according to the present invention described above may be implemented in a form of executable program command through various computer elements and may be recorded on a computer-readable recording medium. The computer-readable recording medium may include, alone or in combination with, a program instruction, a data file, a data structure, and the like. The program instruction recorded on the computer-readable recording medium may be one specially designed and configured for the present invention or one well-known and available to those skilled in the art of computer software. Examples of the computer-readable medium include a magnetic medium such as a hard disk, a floppy disk, and a magnetic tape, an optical recording medium such as a CD-ROM and a DVD, a magneto-optical medium such as a floptical disk, and a hardware device specially configured to store and execute a program instruction such as a ROM, a RAM, and a flash memory. Examples of the program instruction include a high-level language code that may be executed by a computer using an interpreter or the like, as well as a machine language such as a code generated by a complier. The hardware device may be configured to operate as one or more software modules in order to perform the process according to the present invention, and vice versa.

The invention claimed is:

1. A method of providing an advertisement to a lock screen of a portable communication terminal using a shopping application, the method comprising:
   providing the shopping application that is capable of being installed in a portable communication terminal and enables a user to search for and purchase a product, wherein the shopping application provides a product information provision screen that includes a description of a product, a payment interface, and an interest product registration interface;
   receiving an interest product registration information by the server, wherein the interest product content registration information is generated from the shopping application in a case where a user registers the product provided from the shopping application as the interest product through the interest product registration interface of the product information provision screen and transmitted from the shopping application to the server, and
   determining, by the server, an advertisement for an adjacent product related to the interest product wherein the determining includes comparing, by the server, the interest product with a plurality of contents that are able to be provided;
   wherein, when the portable communication terminal is switched to the active state in response to an input from the user in the inactive state, the lock screen displayed on the display includes the advertisement, a link interface for displaying an additional information of the advertisement, and an unlock interface for entering to a standby screen of the portable communication terminal,
   wherein the addition information of the advertisement includes the product information provision screen of the shopping application for the adjacent product.

2. The method of claim 1,
   wherein the determining the advertisement comprises:
   checking the product registered as the interest product;
   setting a priority according to a similarity between the interest product and the plurality of contents that are able to be provided through the comparing; and
   determining the advertisement among the plurality of contents that are able to be provided according to the set priority.

3. The method of claim 2, wherein the advertisement includes a plurality of contents, and
 positions of the plurality of contents are disposed on the lock screen or sizes of the plurality of contents are displayed on the lock screen are different according to the priority.

4. The method of claim 2, wherein the advertisement includes a plurality of contents,
 the lock screen includes a main screen that is displayed when the display is turned on and a sub screen that is displayed according to an up-down or left-right scroll, and
 the plurality of contents are selectively displayed on the main screen or the sub screen according to the priority.

5. The method of claim 1, wherein the advertisement includes an update content of the interest product.

6. The method of claim 1, wherein the advertisement has the same category as the interest product.

7. The method of claim 1, wherein the additional information of the advertisement provides an input interface capable of purchasing a product displayed by the advertisement.

8. The method of claim 7, wherein the determining the advertisement comprises:
 checking the product registered as the interest product;
 searching for the same product as the interest product;
 checking product information of which a price is lower than a price suggested in the interest product among the same products as the interest product; and
 determining the checked product information as the advertisement.

9. The method of claim 1, wherein, in a case where an input for the link interface is received from the user, a reward is saved for the user.

10. The method of claim 9, wherein the reward is usable as payment means in the additional information of the advertisement.

* * * * *